United States Patent
Zhang et al.

(10) Patent No.: US 12,159,529 B2
(45) Date of Patent: Dec. 3, 2024

(54) COMMUNICATION METHODS AND APPARATUSES, ELECTRONIC DEVICES AND COMPUTER READABLE STORAGE MEDIA

(71) Applicant: BOE Technology Group Co., Ltd., Beijing (CN)

(72) Inventors: Zhe Zhang, Beijing (CN); Naifu Wu, Beijing (CN); Yingjie Li, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 232 days.

(21) Appl. No.: 17/788,585

(22) PCT Filed: Jun. 22, 2021

(86) PCT No.: PCT/CN2021/101642
§ 371 (c)(1),
(2) Date: Jun. 23, 2022

(87) PCT Pub. No.: WO2021/259289
PCT Pub. Date: Dec. 30, 2021

(65) Prior Publication Data
US 2023/0103343 A1 Apr. 6, 2023

(30) Foreign Application Priority Data
Jun. 22, 2020 (CN) .......................... 202010577137.9

(51) Int. Cl.
*G08B 7/06* (2006.01)
*G10L 15/22* (2006.01)

(52) U.S. Cl.
CPC ................ *G08B 7/06* (2013.01); *G10L 15/22* (2013.01)

(58) Field of Classification Search
CPC ... G10L 15/22; G10L 2015/223; G10L 15/08; G10L 2015/088; G10L 17/00;
(Continued)

(56) References Cited

U.S. PATENT DOCUMENTS

| | | | |
|---|---|---|---|
| 6,567,839 B1 * | 5/2003 | Borkenhagen | G06F 9/3009 |
| | | | 718/107 |
| 10,304,452 B2 | 5/2019 | Kume et al. | |
| 2017/0061750 A1 * | 3/2017 | Eyring | G08B 13/19695 |
| 2022/0350635 A1 | 11/2022 | Li et al. | |

FOREIGN PATENT DOCUMENTS

| | | |
|---|---|---|
| CN | 103888627 A | 6/2014 |
| CN | 104485738 A | 4/2015 |

(Continued)

OTHER PUBLICATIONS

PCT/CN2021/101642 international search report.
PCT/CN2021/101642 Written Opinion.
CN2020105771379 first office action.

*Primary Examiner* — Angela A Armstrong
(74) *Attorney, Agent, or Firm* — IPro, PLLC

(57) ABSTRACT

A communication methods, including: receiving first information by a first control panel of a plurality of control panels; determining one or more target control panels from the plurality of control panels (S101), where the plurality of control panels are disposed in different rooms, or at least partially at different locations in a same room; for each of the one or more target control panels, detecting whether a room where the target control panel is located is occupied (S102); in response to determining that there is an occupant, sending the first information to the target control panel by the first control panel (S103), and outputting the first information from the target control panel (S104); and in response to determining that there is no occupant, generating first prompt information by the first control panel (S105).

11 Claims, 12 Drawing Sheets

(58) Field of Classification Search
CPC .......... G10L 15/1822; G10L 15/05; G10L 2015/227; G10L 15/30; G10L 15/063; G10L 2015/226; G10L 15/26; G10L 17/22; G10L 17/24; G08B 13/19608; G08B 13/19645; G08B 13/19663; G08B 13/19697; G08B 7/06; G08B 21/24; G08B 21/0202; H04M 3/2245; H04M 3/2254; H04M 3/5183; G06F 3/167; G06F 2221/2111; G06F 9/4881; G06F 3/165; G06F 12/0871; G06F 1/3209; G06F 1/3215; G06V 40/19; G06V 40/10; H04L 12/282; H04L 12/2803; H04L 12/2816; Y02P 90/02

See application file for complete search history.

(56) References Cited

FOREIGN PATENT DOCUMENTS

| | | | |
|---|---|---|---|
| CN | 106328131 A | 1/2017 | |
| CN | 107026943 A | 8/2017 | |
| CN | 108198556 A | 6/2018 | |
| CN | 109802876 A | 5/2019 | |
| CN | 109936814 A | 6/2019 | |
| CN | 110265004 A | 9/2019 | |
| CN | 110473555 A | 11/2019 | |
| CN | 110647477 A | 1/2020 | |
| CN | 111143032 A | 5/2020 | |
| CN | 111221829 A | 6/2020 | |
| CN | 111667820 A | 9/2020 | |

\* cited by examiner

COMMUNICATION METHODS AND APPARATUSES, ELECTRONIC DEVICES AND COMPUTER READABLE STORAGE MEDIA

CROSS-REFERENCE TO RELATED APPLICATIONS

This application is a national stage of international PCT Application No. PCT/CN2021/101642 filed on Jun. 22, 2021, the entire contents of which are incorporated herein by reference.

TECHNICAL FIELD

The present disclosure relates to the field of smart home technologies, and in particular, to communication methods and apparatuses, electronic devices and computer readable storage media.

BACKGROUND

In current home life, persons in different rooms communicate usually by shouting to directly convey voice information.

However, in the case of a large house, for example, user 1 is in room A, and needs to talk to user 2 in room B, but the room A is on a first floor, and the room B is on a third floor, because their distance is too far, it is difficult to convey voice shouted out from the room A to the room B. Instead, the user 1 needs to walk from the room A to the room B to talk to the user 2.

In some cases, it is inconvenient for the user 1 to leave the room A, for example, the room A is a kitchen, and the user 1 is cooking. Therefore, there are many inconveniences in the way of communication between users at home at present.

SUMMARY

The present disclosure provides communication methods and apparatuses, electronic devices and computer readable storage media to solve deficiencies in the related art.

According to a first aspect of examples of the present disclosure, there is provided a communication method, including: receiving first information by a first control panel of a plurality of control panels: determining one or more target control panels from the plurality of control panels, where the plurality of control panels are disposed in different rooms, or at least partially at different locations in a same room: for each of the one or more target control panels, detecting whether a room where the target control panel is located is occupied: in response to determining that the room where the target control panel is located is occupied, sending, by the first control panel, the first information to the target control panel, and outputting the first information from the target control panel; and in response to determining that the room where the target control panel is located is not occupied, generating first prompt information by the first control panel.

According to a second aspect of the examples of the present disclosure, there is provided a communication apparatus, including: an information receiving module, configured to receive first information by a first control panel of a plurality of control panels, and determine one or more target control panels from the plurality of control panels, where the plurality of control panels are disposed in different rooms, or at least partially at different locations in a same room: an occupant detection module, configured to for each of the one or more target control panels, detect whether a room where the target control panel is located is occupied: an information sending module, configured to, in response to determining that the room where the target control panel is located is occupied, send the first information to the target control panel by the first control panel: an information output module, configured to output the first information from the target control panel; and a first prompt module, configured to, in response to determining that the room where the target control panel is located is not occupied, generate first prompt information by the first control panel.

According to a third aspect of the examples of the present disclosure, there is provided an electronic device, including: one or more processors; and a memory for storing instructions executable by the one or more processors, where the one or more processors are configured to execute the instructions to implement the method according to the first aspect.

According to a fourth aspect of the examples of the present disclosure, there is provided a computer non-transitory readable storage medium, where, when instructions in the computer non-transitory readable storage medium are executed by one or more processors of an electronic device, the electronic device is caused to implement the method according to the first aspect.

It should be understood that the above general description and the following detailed description are only exemplary and explanatory and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
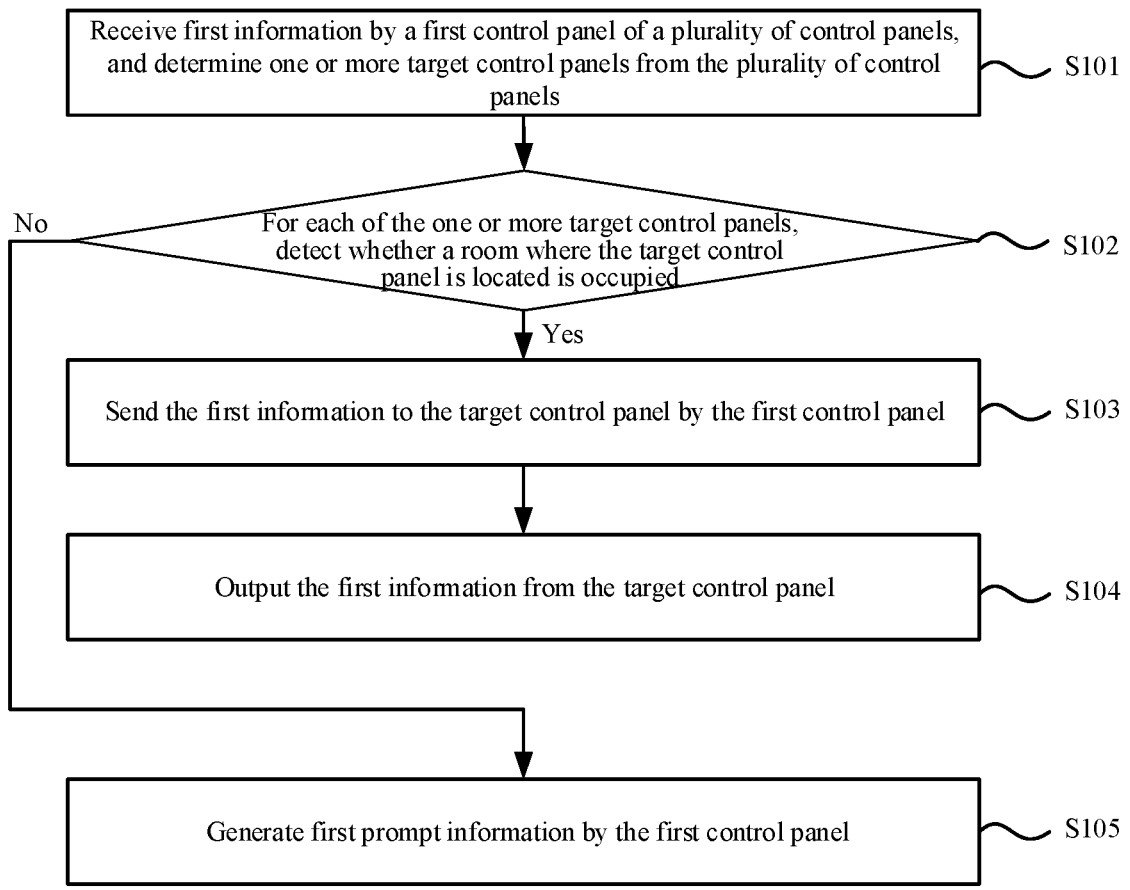
FIG. 1 is a schematic flowchart illustrating a communication method according to an example of the present disclosure.

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

FIG. 1 is a schematic flowchart illustrating a communication method according to an example of the present disclosure. The communication method in this example may be applicable to an electronic device, including, but not limited to, a smart home device, and the smart home device may include a plurality of control panels. The plurality of control panels may be disposed in different rooms, or at least partially at different locations in the same room. Each control panel may be the same device, and for each control panel, it may act as a first control panel in a communication process and as a second control panel in another communication process.

Suppose a house includes 9 rooms: 5 bedrooms, 1 kitchen, 2 living rooms, and 1 study: In an example, the plurality of control panels may include 9 control panels, and different control panels are respectively disposed in different rooms. In another example, the plurality of control panels may include 10 control panels, and a living room a of the 2 living rooms is larger, so that 2 control panels of the 10 control panels may be disposed at different locations in the living room a, and the rest 8 control panels are respectively disposed in 8 rooms other than the living room a.

As shown in FIG. 1, the communication method may include the following steps S101 to S105.

S101, first information is received by a first control panel of a plurality of control panels, and one or more target control panels are determined from the plurality of control panels, where the plurality of control panels are disposed in different rooms, or at least partially at different locations in a same room.

S102, for each of the one or more target control panels, it is detected whether a room where the target control panel is located is occupied.

S103, in response to determining that the room where the target control panel is located is occupied, the first information is sent to the target control panel by the first control panel.

S104, the first information is output from the target control panel.

S105, in response to determining that the room where the target control panel is located is not occupied, first prompt information is generated by the first control panel.

In an example, a user may first determine the one or more target control panels from the plurality of control panels. And then for each of the one or more target control panels, it is detected whether the room where the target control panel is located is occupied. In response to determining that the room where the target control panel is located is occupied, the first information is received by the first control panel, and the first information is sent to the target control panel by the first control panel.

In an example, the user may speak to the first control panel, voices uttered by the user may be received by the first control panel as the first information, and the user may determine the one or more target control panels from the plurality of control panels. Further, the first control panel may send the first information to the one or more target control panels, so that each of the one or more target control panels outputs the first information.

A manner in which the target control panel outputs the first information may include displaying the first information on an interface of the target control panel in a form of texts, or outputting the first information in a form of voices.

It should be noted that the control panels can receive the voices of the user, and analyze semantics of the voices. For example, the user can speak to the first control panel, and the spoken voices are "send information to children room, come out to eat". The first control panel can determine that the voices include two parts of contents through semantic analysis of the voices. A first part of contents is a voice command "send information to children room" for selecting a target control panel, and a second part of contents is the first information "come out to eat" that needs to be sent to the target control panel.

In addition to selecting the target control panel through the voice command, the target control panel can be selected through manual operation on the first control panel. For example, the first control panel can display identifiers of the plurality of control panels, and the user can select a children room control panel by selecting an identifier of the children room control panel.

Figure 2:
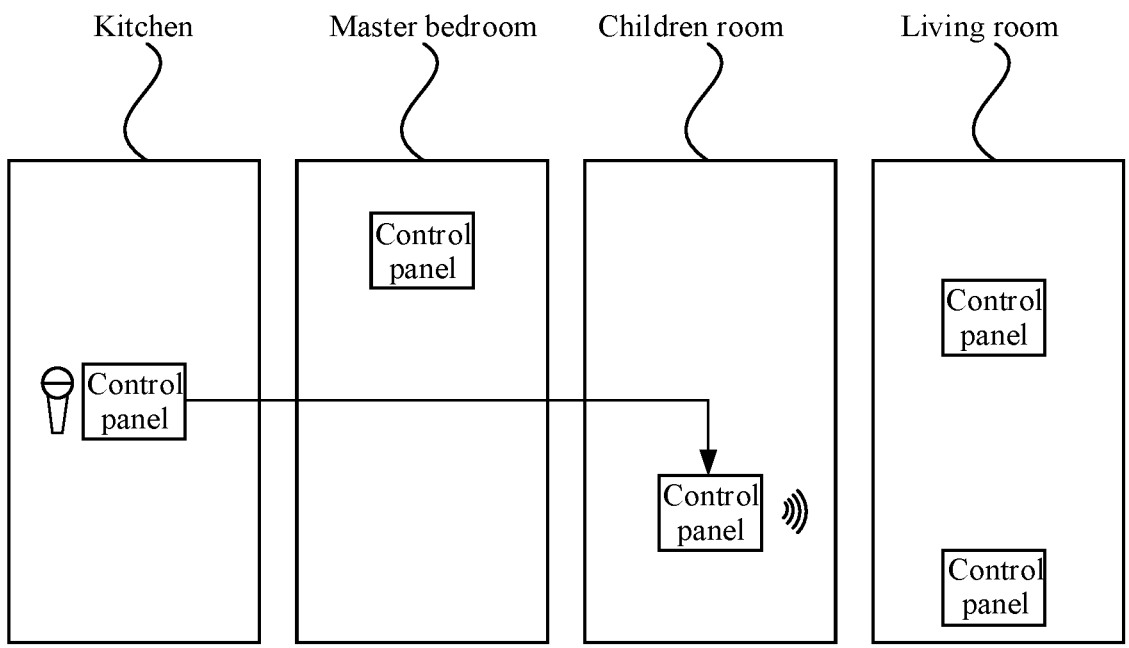
FIG. 2 is a schematic diagram illustrating an application scenario of a communication method according to an example of the present disclosure.

FIG. 2 is a schematic diagram illustrating an application scenario of a communication method according to an example of the present disclosure.

As shown in FIG. 2, taking 4 rooms: a kitchen, a master bedroom, a children room, and a living room as examples, the kitchen, the master bedroom, and the children room are respectively provided with 1 control panel, and the living room is provided with 2 control panels in different locations.

For example, if a user is in the kitchen, and operates a kitchen control panel to select a children room control panel, the kitchen control panel is a first control panel, and the children room control panel is a target control panel.

Further, the user, after selecting the children room control panel as the target control panel through the first control panel, can utter a voice "come out to eat" as first information to the first control panel. The first control panel can send the first information to the target control panel. The target control panel can output the first information, for example, in a form of voices to utter "come out to eat", so that an occupant in the children room can learn the first information, and then come out to eat.

Figure 3:
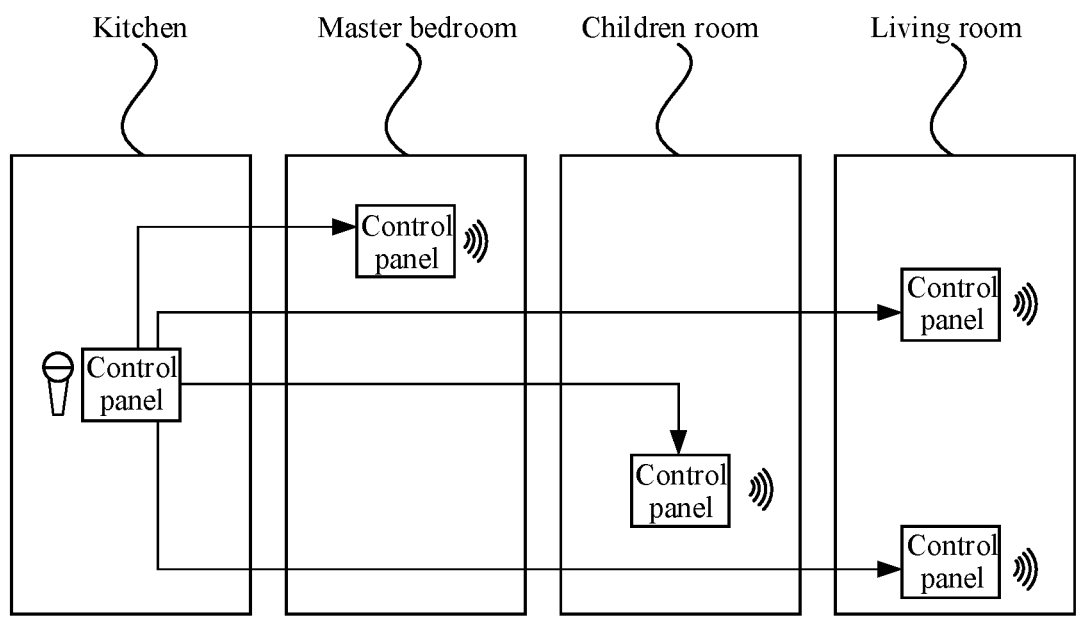
FIG. 3 is a schematic diagram illustrating another application scenario of a communication method according to an example of the present disclosure.

FIG. 3 is a schematic diagram illustrating another application scenario of a communication method according to an example of the present disclosure.

As shown in FIG. 3, taking 4 rooms: a kitchen, a master bedroom, a children room, and a living room as examples, the kitchen, the master bedroom, and the children room are respectively provided with 1 control panel, and the living room is provided with 2 control panels in different locations.

For example, if a user is in the kitchen, and operates a kitchen control panel to select children room, master bedroom, and living room control panels, the kitchen control panel is a first control panel, and 4 control panels: the children room, master bedroom, and living room control panels are target control panels. That is, a number of the target control panels may be one or more.

Further, the user, after selecting the 4 control panels: the children room, master bedroom, and living room control panels as the target control panels through the first control panel, can utter a voice "come out to eat" as first information to the first control panel. The first control panel can send the first information to the plurality of target control panels respectively, and the plurality of target control panels can output the first information respectively, for example, in a form of voices, to utter "come out to eat", so that occupants in the children room, the master bedroom, and the living room can learn the first information, and then come out to eat.

According to examples of the present disclosure, for each of one or more target control panels, a user in a room where a first control panel is located can convey information to a user in a room where the target control panel is located through the first control panel, without shouting or walking to corresponding rooms, which increases the convenience of conveying information between users at home.

Optionally, detecting whether the room where the target control panel is located is occupied includes: detecting whether the room where the target control panel is located is occupied by an infrared image acquisition device and/or a visible light image acquisition device.

In an example, before the first information is sent to the target control panel by the first control panel, it may be first detected whether the room where the target control panel is located is occupied.

For example, respective rooms including the one or more rooms where the one or more target control panels are located can be provided with infrared image acquisition devices, so that for each of the one or more target control panels, it can be detected whether the room where the target control panel is located is occupied through the infrared image acquisition device. For example, an infrared image may be first acquired, and then it is determined whether an occupant is involved in the infrared image.

In addition to the infrared image acquisition devices, visible light image acquisition devices can be provided in all rooms including the one or more rooms where the one or more target control panels are located, so that for each of the one or more target control panels, it can be detected whether the room where the target control panel is located is occupied through the visible light image acquisition device. For example, a visible light image may be first acquired, and then it is determined whether an occupant is involved in the visible light image.

In a case where the room where the target control panel is located is occupied, the first information is sent to the target control panel by the first control panel. In a case where the room where the target control panel is located is not occupied, the first information is not necessarily sent to the target control panel by the first control panel, and instead, the first prompt information may be generated by the first control panel. The user can be prompted by the first prompt information that the room where the target control panel is located is not occupied, so that the user can timely learn situations in the room where the target control panel is located.

Figure 4:
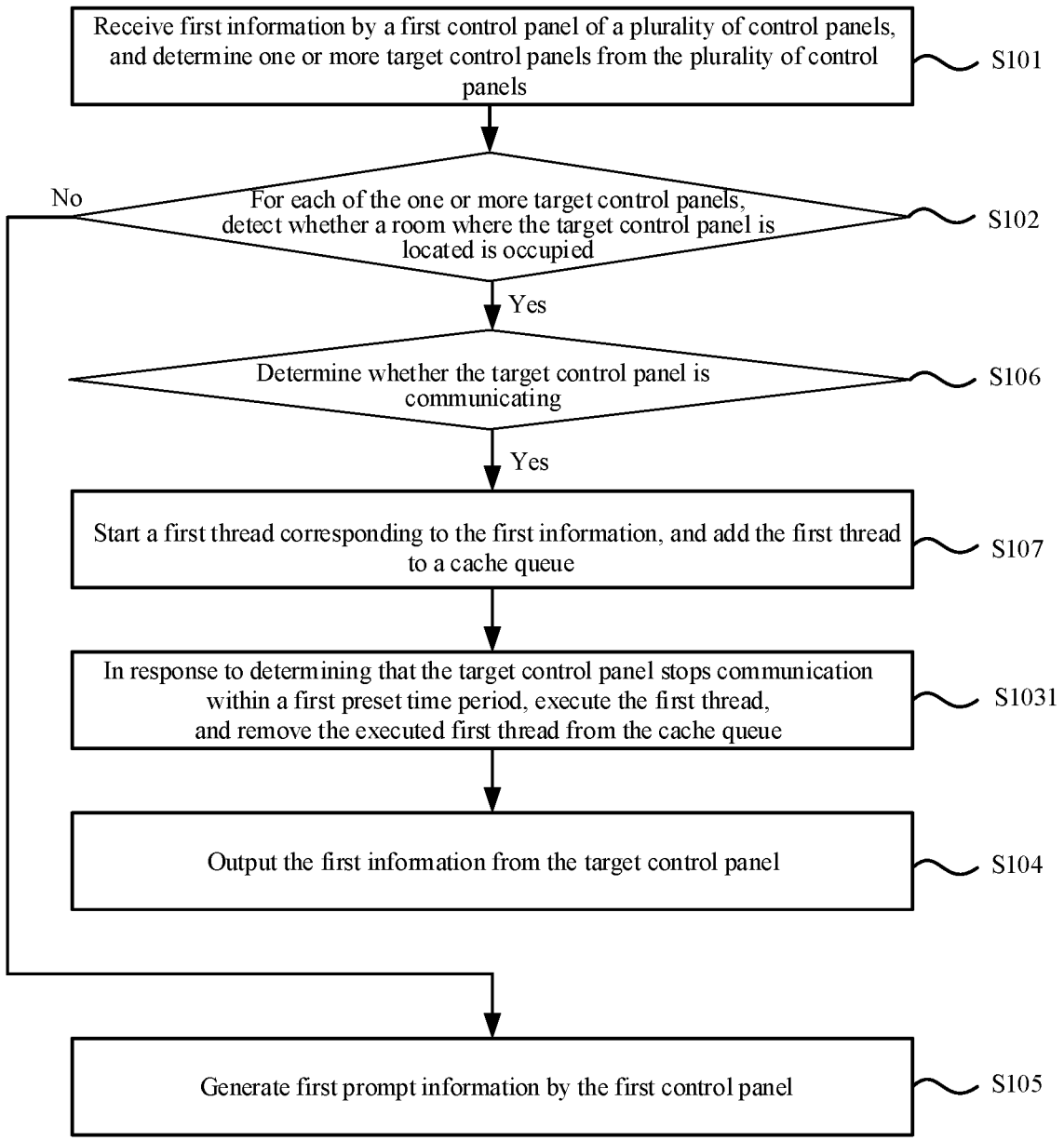
FIG. 4 is a schematic flowchart illustrating another communication method according to an example of the present disclosure.

FIG. 4 is a schematic flowchart illustrating another communication method according to an example of the present disclosure. As shown in FIG. 4, before sending the first information to the target control panel by the first control panel, the method further includes steps S106 to S107.

S106, it is determined whether the target control panel is communicating; and S107, in response to determining that the target control panel is communicating, a first thread corresponding to the first information is started, and the first thread is added to a cache queue, where the first thread is configured to send the first information to the target control panel by the first control panel.

Sending the first information to the target control panel by the first control panel includes: S1031, in response to determining that the target control panel stops communication within a first preset time period, the first thread is executed, and the executed first thread is removed from the cache queue.

In an example, before the first information is sent to the target control panel by the first control panel, it may be first determined whether the target control panel is communicating, and in response to determining that the target control panel is communicating, it may be determined that a communication channel between the first control panel and the target control panel is temporarily blocked, so that the first thread corresponding to the first information can be started, and the first thread can be added to the cache queue for subsequently sending the first information.

Further, in response to determining that the target control panel stops the communication within the first preset time period, the first thread is executed, so that the first information is sent to the target control panel by the first control panel, and the executed first thread is removed from the cache queue; and in response to determining that the target control panel is still communicating within the first preset time period, the first thread is stored in the cache queue.

In a case where a time period of the first thread existing in the cache queue does not exceed the first preset time period and it is determined that the target control panel stops the communication, then it may be determined that the communication channel between the first control panel and the target control panel is no longer blocked, so that the first thread can be executed, and the first information is sent to the target control panel by the first control panel, then the executed first thread is removed from the cache queue.

In a case where the time period of the first thread existing in the cache queue does not exceed the first preset time period and it is determined that the target control panel does not stop the communication, then it may be determined that the communication channel between the first control panel and the target control panel is still blocked, so that the first thread can be stored in the cache queue for subsequently executing the first thread to send the first information.

Figure 5:
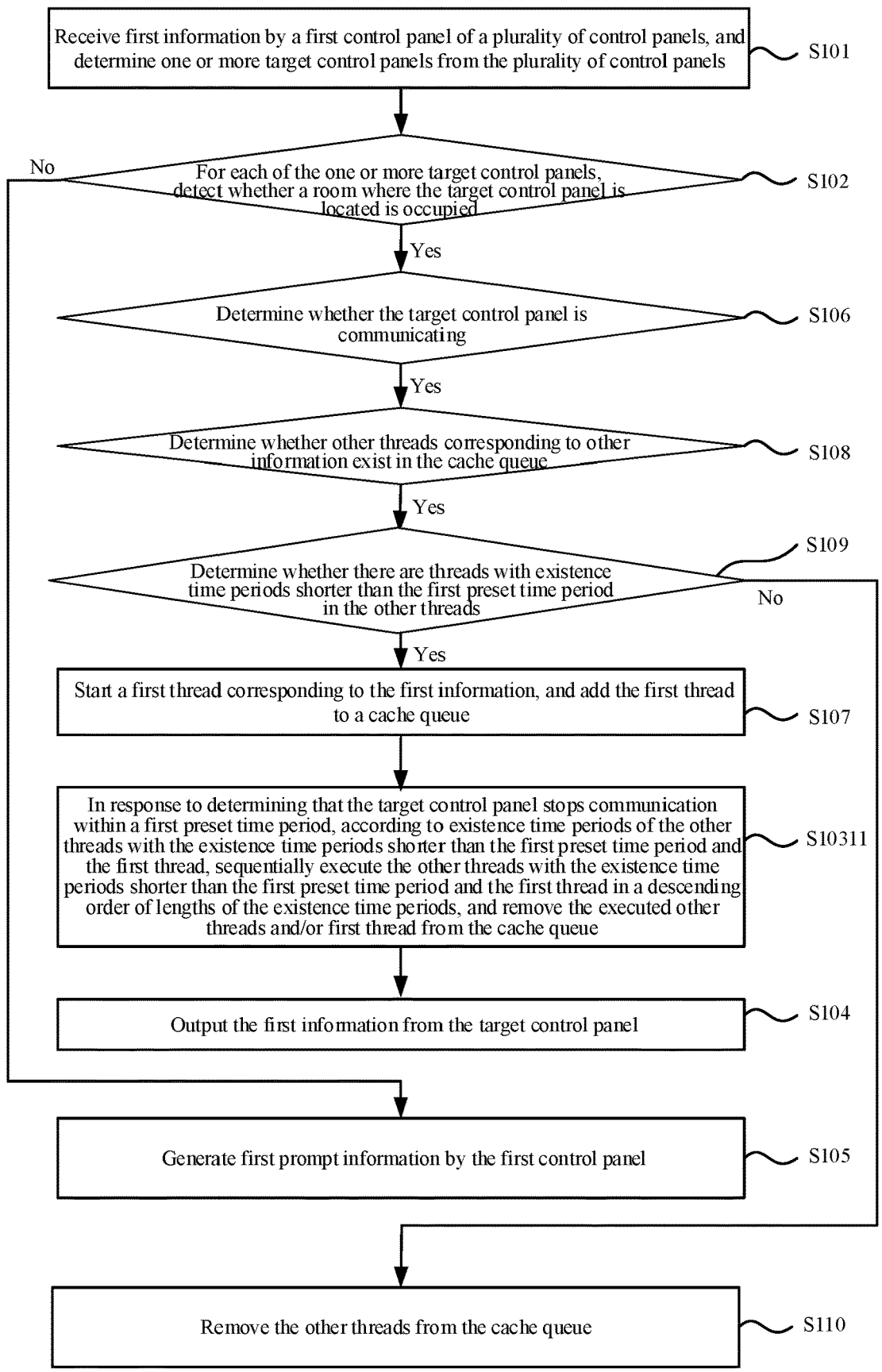
FIG. 5 is a schematic flowchart illustrating another communication method according to an example of the present disclosure.

FIG. 5 is a schematic flowchart illustrating another communication method according to an example of the present disclosure. As shown in FIG. 5, before starting the first thread corresponding to the first information, the method further includes steps S108 to S110.

S108, it is determined whether other threads corresponding to other information exist in the cache queue, where the other threads are configured to send the other information to the target control panel by the first control panel.

S109, in response to determining that the other threads exist, it is determined whether there are threads with existence time periods shorter than the first preset time period in the other threads.

S110, in response to determining that there is no thread with an existence time period shorter than the first preset time period in the other threads, the other threads are removed from the cache queue.

After the other threads are removed from the cache queue in S110, the first thread corresponding to the first information is started, and the first thread is added to the cache queue.

In response to determining that there are threads with the existence time periods shorter than the first preset time period in the other threads, and control panels to which the other information needs to be sent are the same as the target control panel, the first thread corresponding to the first information is started, and when there are some threads with existence time periods longer than or equal to the first preset time period in the other threads, the some threads in the other threads are removed from the cache queue; and executing the first thread includes: S10311, according to existence time periods of the other threads with the existence time periods shorter than the first preset time period and the first thread, the other threads with the existence time periods shorter than the first preset time period and the first thread are executed sequentially in a descending order of lengths of the existence time periods, and the executed other threads and/or first thread are removed from the cache queue.

It should be noted that the steps S108 to S110 may be executed before the step S107, while the step S10311 needs to be executed after the first thread corresponding to the first information is started in the step S107.

In an example, before the first thread corresponding to the first information is started, the cache queue may be first updated, for example, it is determined whether other threads corresponding to other information exist in the cache queue, where the other threads are configured to send the other information to the target control panel by the first control panel.

If the other threads exist in the cache queue, it is further determined whether there are threads with existence time periods shorter than the first preset time period in the other threads. That is, it is determined whether the threads in the other threads have timed out. If there are threads with the existence time periods shorter than the first preset time period in the other threads, that is, there are threads that have not timed out, and control panels to which the other information needs to be sent are the same as the target control panel, the other threads with the existence time periods shorter than the first preset time period and the first thread can be executed sequentially, so that the other information with existence time periods shorter than the first preset time period and the first information are sent sequentially to the target control panel.

For example, by comparing existence time periods of the other threads with the existence time periods shorter than the first preset time period and the first thread, information corresponding to threads with longer existence time periods is first sent, and then information corresponding to threads with shorter existence time periods is sent, thereby ensuring that other threads which have existed in the cache queue can successfully send corresponding other information to the target control panel without timeout.

If there is no thread with an existence time period shorter than the first preset time period in all the other threads, that is, the other threads all time out, the other threads may be removed from the cache queue.

Figure 6:
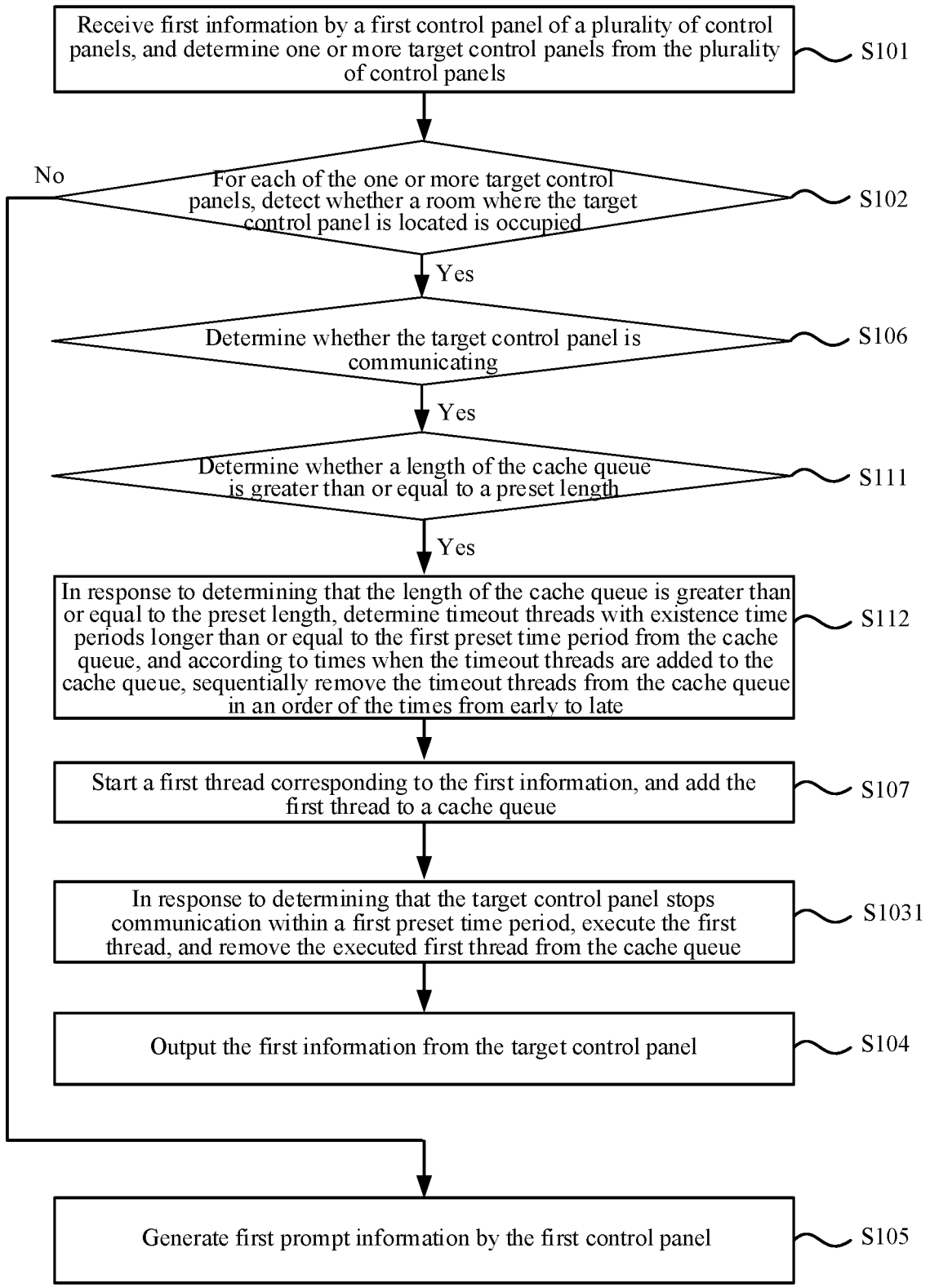
FIG. 6 is a schematic flowchart illustrating another communication method according to an example of the present disclosure.

FIG. 6 is a schematic flowchart illustrating another communication method according to an example of the present disclosure. As shown in FIG. 6, before starting the first thread corresponding to the first information, the method further includes steps S111 to S112.

S111, it is determined whether a length of the cache queue is greater than or equal to a preset length.

S112, in response to determining that the length of the cache queue is greater than or equal to the preset length, timeout threads with existence time periods longer than or equal to the first preset time period are determined from the cache queue, and according to times when the timeout threads are added to the cache queue, the timeout threads are sequentially removed from the cache queue in an order of the times from early to late.

In an example, before the first thread corresponding to the first information is started, the length of the cache queue may be first checked. Since the length of the cache queue is limited, if the length of the cache queue is greater than or equal to the preset length, it may be determined that the length of the cache queue exceeds the limit. In this case, it is difficult to add the first thread to the cache queue.

In an example, the timeout threads with the existence time periods longer than or equal to the first preset time period are determined from the cache queue, and then according to the times when the timeout threads are added to the cache queue, the timeout threads are sequentially removed from the cache queue in an order of the times from early to late, so that the timeout threads with the longer existence time periods are removed from the cache queue, and further the first thread corresponding to the first information can be added to the cache queue or the first thread corresponding to the first information can be added to the cache queue as early as possible.

Figure 7:
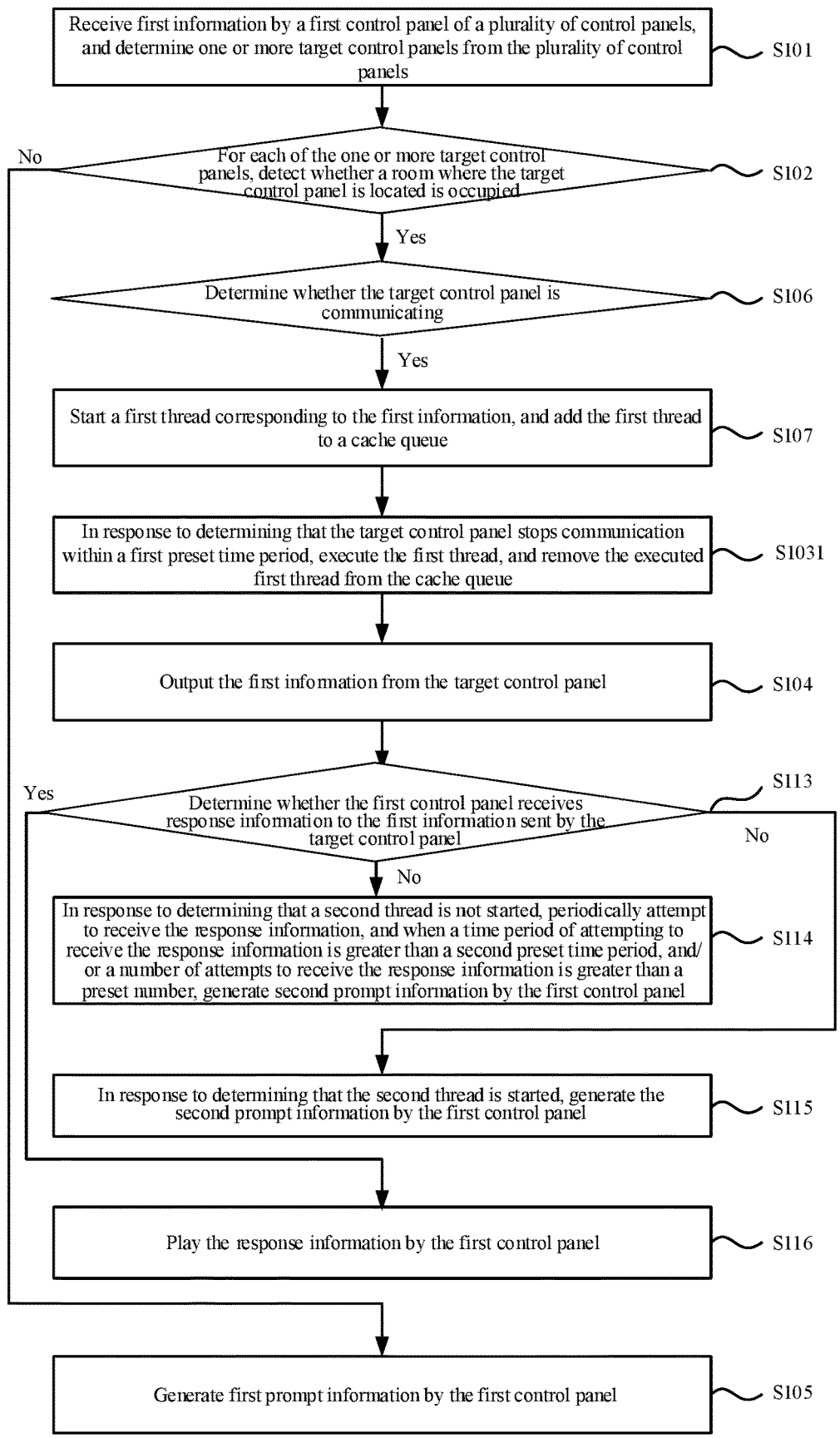
FIG. 7 is a schematic flowchart illustrating another communication method according to an example of the present disclosure.

FIG. 7 is a schematic flowchart illustrating another communication method according to an example of the present disclosure. As shown in FIG. 7, after sending the first information to the target control panel through the first control panel, the method further includes steps S113 to S116.

S113, it is determined whether the first control panel receives response information to the first information sent by the target control panel.

S114, in response to determining that the response information is not received and a second thread is not started, attempts to receive the response information is periodically made, and when a time period before the response information is received is greater than a second preset time period, and/or a number of attempts to receive the response information is greater than a preset number, second prompt information is generated by the first control panel.

S115, in response to determining that the response information is not received and the second thread is started, the second prompt information is generated by the first control panel.

S116, in response to determining that the response information is received, the response information is played by the first control panel.

In an example, after the first information is sent to the target control panel by the first control panel, the target control panel may send the response information to the first control panel, for example, the response information may be input by a user in a room where the target control panel is located. If the response information is received, the response information can be played by the first control panel.

If the response information is not received, it may be further determined whether the second thread is started. If the second thread is not started, that is, a communication channel between the first control panel and the target control panel is not blocked, which indicates that a user in a room where the first control panel is located has not waited for the sending of the response information, attempts to receive the response information can be periodically made, so that the user waits for some time.

When the time period before the response information is received is greater than the second preset time period, and/or the number of attempts to receive the response information is greater than the preset number, it is indicated that the user has waited for some time, but the response information is still not received, so that attempts to receive the response information no longer continues to be made, and the second prompt information is generated directly by the first control panel to prompt that the target control panel does not respond.

If the second thread has been started, that is, the communication channel between the first control panel and the target control panel is blocked, the second prompt information can be generated directly by the first control panel to prompt that the target control panel does not respond.

In an example, outputting the first information from the target control panel in S104 and determining whether the first control panel receives the response information to the first information sent by the target control panel in S113 may be executed simultaneously.

Figure 8:
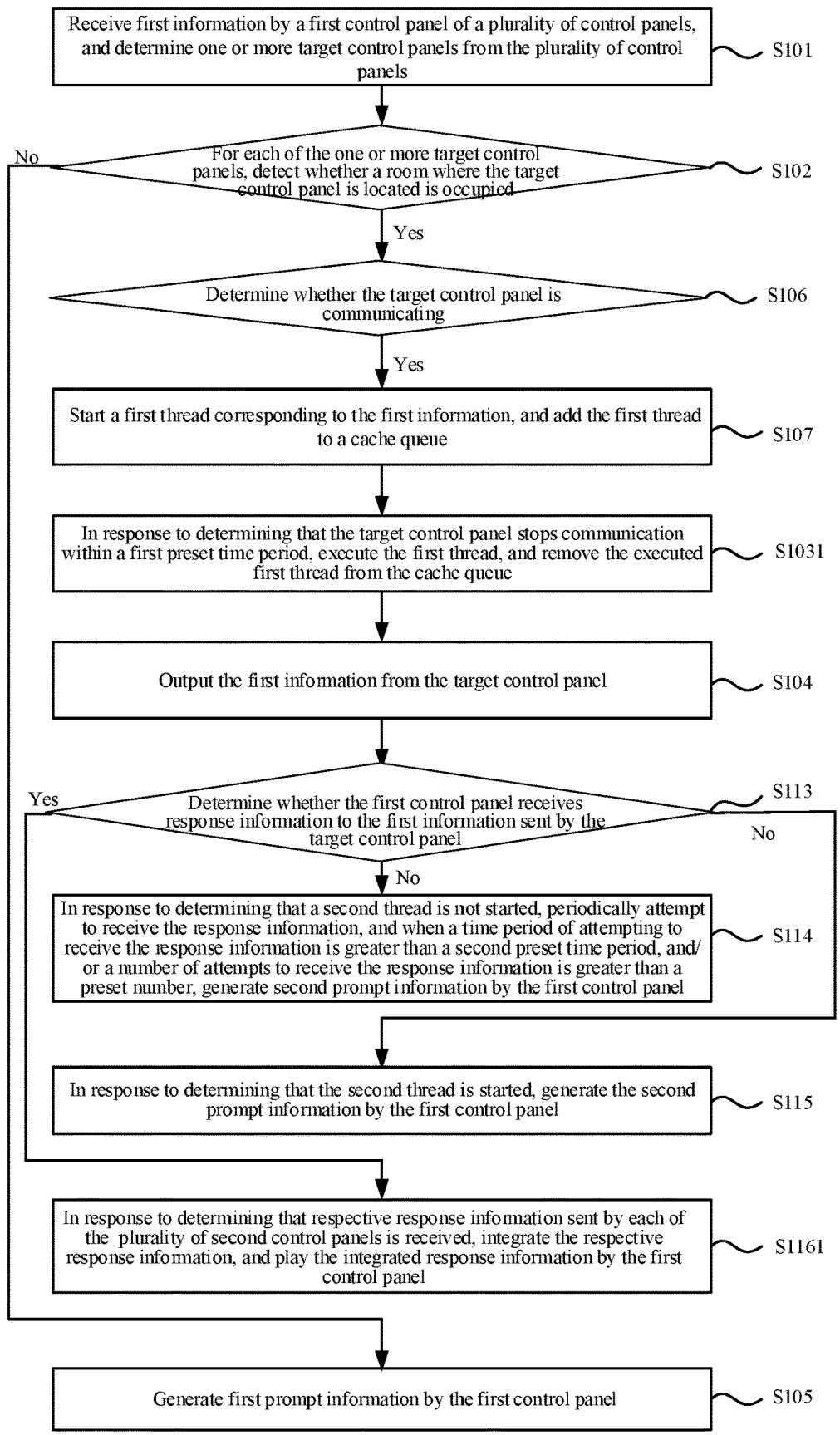
FIG. 8 is a schematic flowchart illustrating another communication method according to an example of the present disclosure.

FIG. 8 is a schematic flowchart illustrating another communication method according to an example of the present disclosure. As shown in FIG. 8, the one or more target control panels include a plurality of second control panels. In response to determining that the response information is received, playing the response information by the first control panel includes: S1161, in response to determining that respective response information sent by each of the plurality of second control panels is received, the respective response information is integrated, and the integrated response information is played by the first control panel.

In an example, in a case where the one or more target control panels include the plurality of second control panels, if the respective response information sent by each of the plurality of second control panels is received, the respective response information may be integrated, and the integrated response information is played by the first control panel. For example, the respective response information corresponding to the plurality of second control panels is integrated and displayed on one page simultaneously, instead of receiving a piece of response information and thereafter displaying the piece of response information repeatedly, thereby improving the efficiency of a user in reviewing the response information.

Figure 9:
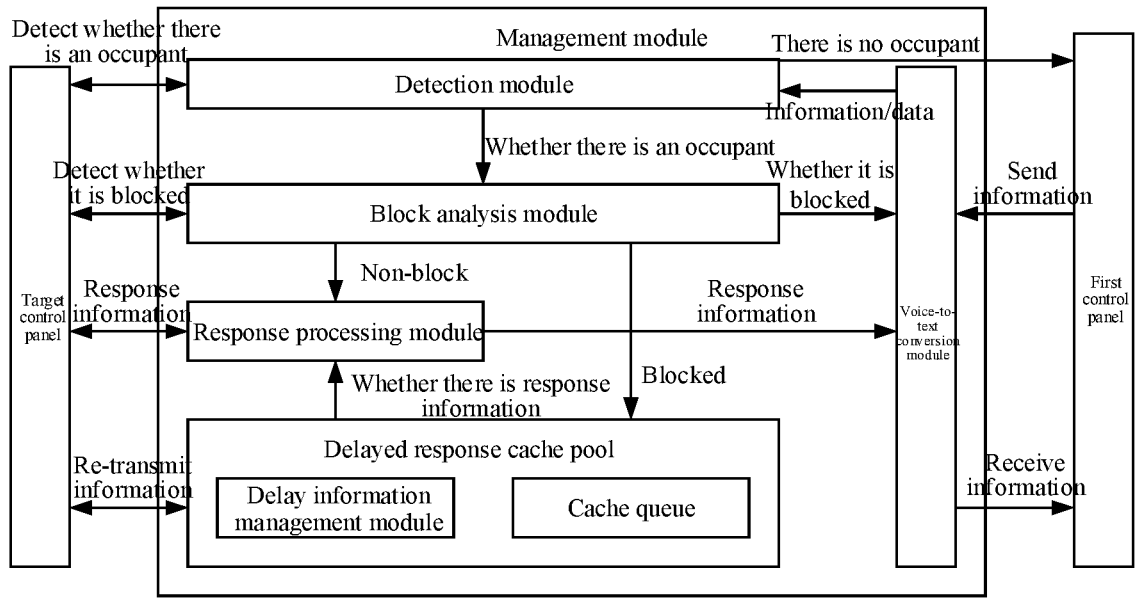
FIG. 9 is a schematic diagram illustrating an information flow corresponding to a communication method according to an example of the present disclosure.

FIG. 9 is a schematic diagram illustrating an information flow corresponding to a communication method according to an example of the present disclosure.

In an example, a smart home device to which the communication method is applicable may include, in addition to a plurality of control panels, a management module for managing communication between the control panels.

A user can input first information, such as voice information, to a first control panel, and the first control panel can send the first information to the management module, where a voice-to-text conversion module can convert the first information from voices to texts, and then send the converted first information to a detection module: the detection module can detect whether a room where a target control panel is located is occupied, and the detection module, when detecting that the room is not occupied, feeds back a detection result of there being no occupant to the first control panel, which generates first prompt information, and when detecting that the room is occupied, sends a detection result of there being an occupant to a block analysis module.

The block analysis module can detect whether the target control panel is communicating. If the target control panel is communicating, it is indicated that a communication channel between the first control panel and the target control panel is blocked, so that the block analysis module sends a block detection result and the first information to a delayed response cache pool. If the target control panel is not communicating, it is indicated that the communication channel between the first control panel and the target control panel is not blocked, so that the block analysis module sends a non-block detection result and the first information to a response processing module.

If the communication channel between the first control panel and the target control panel is not blocked, the response processing module can send the first information to the target control panel, receive response information from the target control panel, and send the response information to the voice-to-text conversion module. The voice-to-text conversion module converts the response information into voices, and sends the voices to the first control panel for output. Of course, the response information may be directly sent to the first control panel without conversion.

If the communication channel between the first control panel and the target control panel is blocked, a first thread corresponding to the first information can be established, and then the first thread is added to a cache queue. A delay information management module, in a case where the first thread has not timed out, if determining that the block is released, can send the first information to the target control panel, and if the first thread has timed out, can remove the first thread from the cache queue.

Corresponding to the communication method examples, the present disclosure further provides communication apparatus examples.

Figure 10:
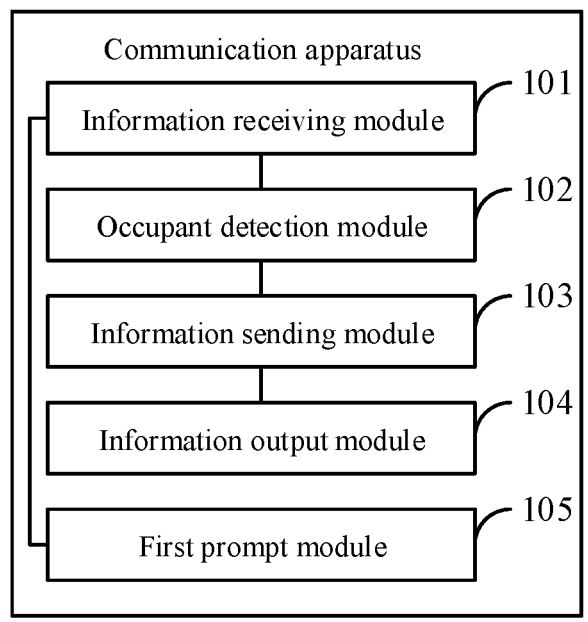
FIG. 10 is a schematic block diagram illustrating a communication apparatus according to an example of the present disclosure.

FIG. 10 is a schematic block diagram illustrating a communication apparatus according to an example of the present disclosure. The communication apparatus in this example may be applied to a smart home device, and the smart home device may include a plurality of control panels. The plurality of control panels may be disposed in different rooms, or at least partially at different locations in the same room. Each control panel may be the same device and may act as a first control panel or a second control panel during use by a user.

As shown in FIG. 10, the communication apparatus may include an information receiving module 101, an occupant detection module 102, an information sending module 103, an information output module 104, and a first prompt module 105.

The information receiving module 101 is configured to receive first information by a first control panel of a plurality of control panels, and determine one or more target control panels from the plurality of control panels, where the plurality of control panels are disposed in different rooms, or at least partially at different locations in a same room.

The occupant detection module 102 is configured to for each of the one or more target control panels, detect whether a room where the target control panel is located is occupied.

The information sending module 103 is configured to, in response to determining that the room where the target control panel is located is occupied, send the first information to the target control panel by the first control panel.

The information output module 104 is configured to output the first information from the target control panel.

The first prompt module 105 is configured to in response to determining that the room where the target control panel is located is not occupied, generate first prompt information by the first control panel.

Optionally, the occupant detection module 102 is configured to detect whether the room where the target control panel is located is occupied by an infrared image acquisition device and/or a visible light image acquisition device.

Figure 11:
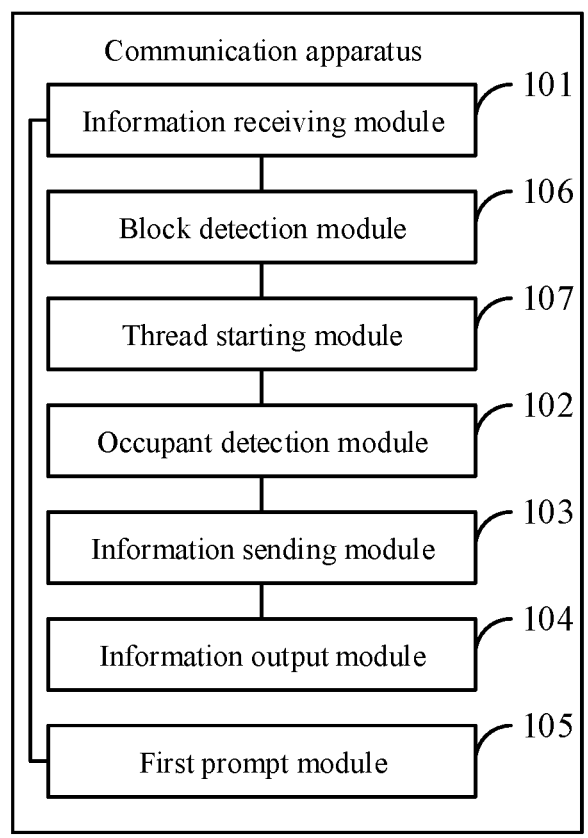
FIG. 11 is a schematic block diagram illustrating another communication apparatus according to an example of the present disclosure.

FIG. 11 is a schematic block diagram illustrating another communication apparatus according to an example of the present disclosure. As shown in FIG. 11, the apparatus further includes: a block detection module 106, configured to determine whether the target control panel is communicating: a thread starting module 107, configured to, in response to determining that the target control panel is communicating, start a first thread corresponding to the first information, and add the first thread to a cache queue, where the first thread is configured to send the first information to the target control panel by the first control panel.

The information sending module 103 is configured to, in response to determining that the target control panel stops communication within a first preset time period, execute the first thread, and remove the executed first thread from the cache queue.

Figure 12:
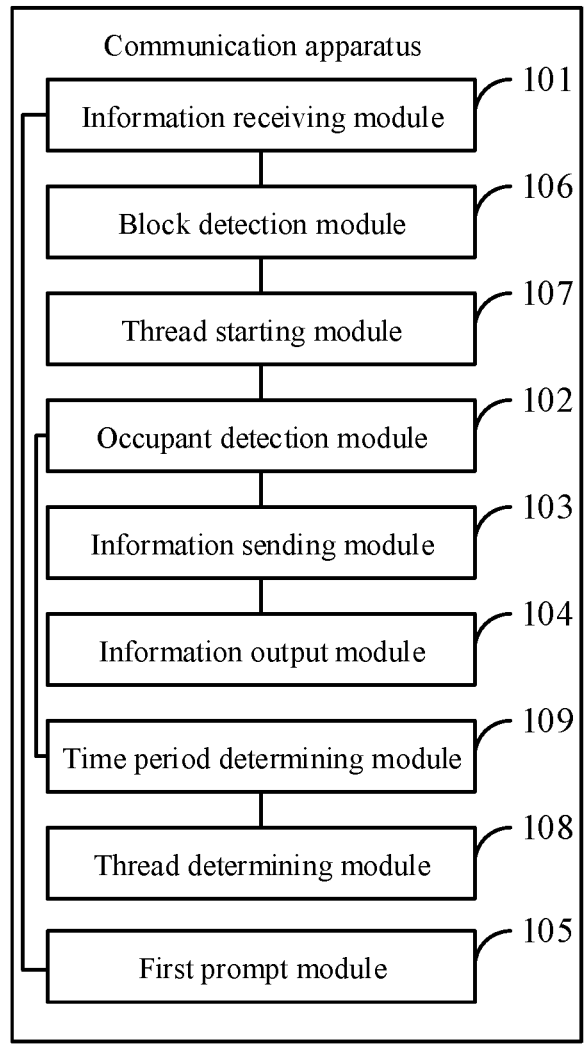
FIG. 12 is a schematic block diagram illustrating another communication apparatus according to an example of the present disclosure.

FIG. 12 is a schematic block diagram illustrating another communication apparatus according to an example of the present disclosure. As shown in FIG. 12, the apparatus further includes: a thread determining module 108, configured to determine whether other threads corresponding to other information exist in the cache queue, where the other threads are configured to send the other information to the target control panel by the first control panel: a time period determining module 109, configured to, in response to determining that the other threads exist, determine whether there are threads with existence time periods shorter than the first preset time period in the other threads.

The information sending module 103 is configured to, in response to determining that there is no thread with an existence time period shorter than the first preset time period in the other threads, remove the other threads from the cache queue.

The thread starting module 107 is configured to, in response to determining that there are threads with the existence time periods shorter than the first preset time period in the other threads, start the first thread corresponding to the first information, and when there are some threads with existence time periods longer than or equal to the first preset time period in the other threads, remove the some threads in the other threads from the cache queue. The information sending module 103 is configured to, according to existence time periods of the other threads with the existence time periods shorter than the first preset time period and the first thread, sequentially execute the other threads with the existence time periods shorter than the first preset time period and the first thread in a descending order of lengths of the existence time periods, and remove the executed other threads and/or first thread from the cache queue.

Figure 13:
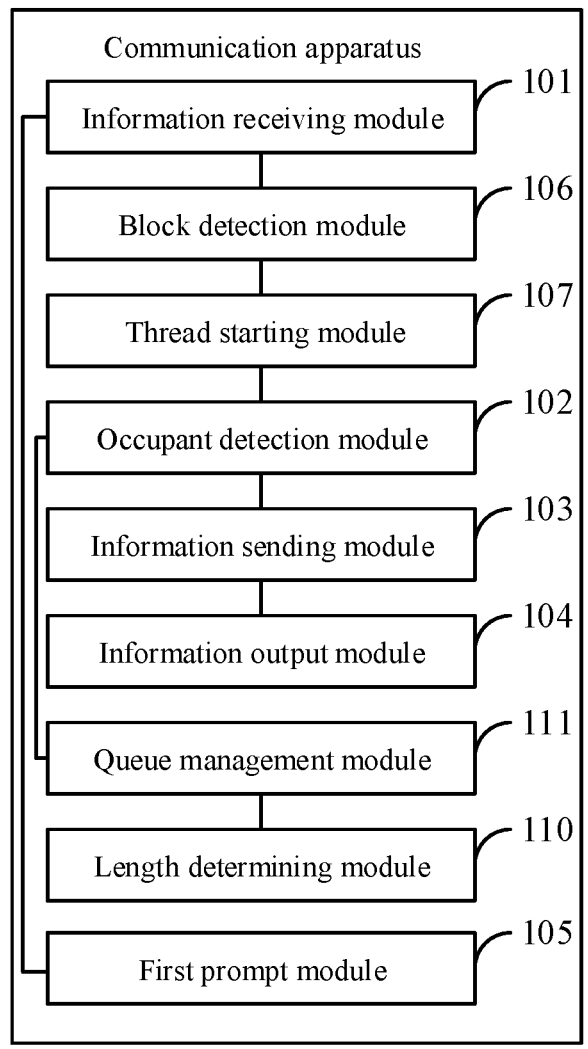
FIG. 13 is a schematic block diagram illustrating another communication apparatus according to an example of the present disclosure.

FIG. 13 is a schematic block diagram illustrating another communication apparatus according to an example of the present disclosure. As shown in FIG. 13, the apparatus further includes: a length determining module 110, configured to determine whether a length of the cache queue is greater than or equal to a preset length: a queue management module 111, configured to, in response to determining that the length of the cache queue is greater than or equal to the preset length, determine timeout threads with existence time periods longer than or equal to the first preset time period from the cache queue, and according to times when the timeout threads are added to the cache queue, sequentially remove the timeout threads from the cache queue in an order of the times from early to late.

Figure 14:
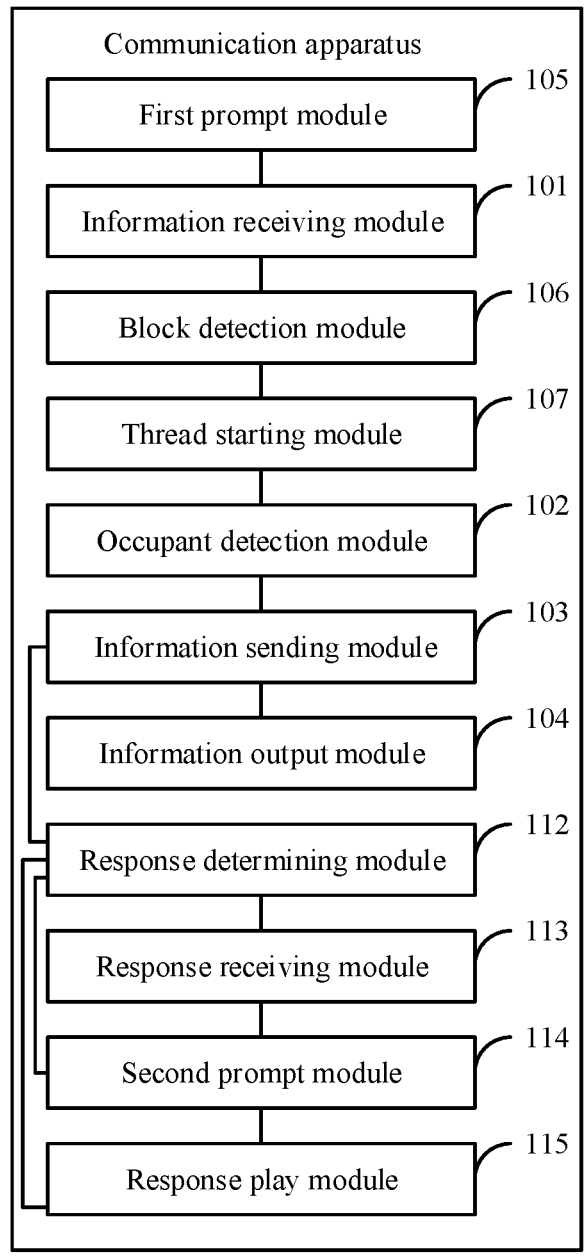
FIG. 14 is a schematic block diagram illustrating another communication apparatus according to an example of the present disclosure.

FIG. 14 is a schematic block diagram illustrating another communication apparatus according to an example of the present disclosure. As shown in FIG. 14, the apparatus further includes: a response determining module 112, a response receiving module 113, a second prompt module 114, and a response play module 115.

The response determining module 112 is configured to determine whether the first control panel receives response information to the first information sent by the target control panel.

The response receiving module 113 is configured to, in response to determining that the response information is not received and a second thread is not started, periodically attempting to receive the response information.

The second prompt module 114 is configured to, when a time period of attempting to receive the response information is greater than a second preset time period, and/or a number of attempts to receive the response information is greater than a preset number, generate second prompt information by the first control panel, and in response to determining that the response information is not received and the second thread is started, generate the second prompt information by the first control panel.

The response play module 115 is configured to, in response to determining that the response information is received, play the response information by the first control panel.

Optionally, the one or more target control panels include a plurality of second control panels: the response play module is configured to, in response to determining that respective response information sent by each of the plurality of second control panels is received, integrate the respective response information, and play the integrated response information by the first control panel.

The present disclosure further provides an electronic device, including: one or more processors; and a memory for storing instructions executable by the one or more processors, where the one or more processors are configured to execute the instructions to implement a method according to any one of the above examples.

The present disclosure further provides a computer non-transitory readable storage medium, where, when instructions in the computer non-transitory readable storage medium are executed by one or more processors of an electronic device, the electronic device is caused to implement a method according to any one of the above examples.

Regarding the apparatuses in the above examples, specific manners in which respective modules perform operations have been described in detail in related method examples, which will not be repeated here.

For the apparatus examples, since they basically correspond to the method examples, reference may be made to the partial description of the method examples. The apparatus examples described above are merely illustrative, where the units described as separate components may or may not be physically separated, and the components displayed as units may or may not be physical units, i.e., may be located in one place or may be distributed to multiple network units. Some or all of the modules may be selected according to actual needs to achieve the objectives of the present disclosure. Those of ordinary skill in the art can understand and implement the present disclosure without any creative effort.

In the present disclosure, terms "first" and "second" are used only for descriptive purposes, and cannot be understood as indicating or implying relative importance. Terms "plurality" and "multiple" refer to two or more, unless clearly defined otherwise.

Other embodiments of the present disclosure will be readily apparent to those skilled in the art after considering the specification and practicing the contents disclosed herein. The present application is intended to cover any variations, uses, or adaptations of the present disclosure, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims.

It is to be understood that the present disclosure is not limited to the precise structures that have described and shown in the drawings, and various modifications and changes can be made without departing from the scope thereof. The scope of the disclosure is to be limited only by the appended claims.

The invention claimed is:

1. A communication method, comprising:
receiving first information by a first control panel of a plurality of control panels;
determining one or more target control panels from the plurality of control panels, wherein the plurality of control panels are disposed in different rooms, or at least partially at different locations in a same room;
for each of the one or more target control panels,
    detecting whether a room where the target control panel is located is occupied;
    in response to determining that the room where the target control panel is located is occupied,
        sending, by the first control panel, the first information to the target control panel, and
        outputting the first information from the target control panel; and
    in response to determining that the room where the target control panel is located is not occupied,
        generating first prompt information by the first control panel;
wherein before sending, by the first control panel, the first information to the target control panel, the method further comprises:
    determining whether the target control panel is communicating;
    in response to determining that the target control panel is communicating, starting a first thread corresponding to the first information, and adding the first thread to a cache queue, wherein the first thread is configured to send the first information to the target control panel by the first control panel;
wherein sending, by the first control panel, the first information to the target control panel comprises:
    in response to determining that the target control panel stops communication within a first preset time period, executing the first thread, and removing the executed first thread from the cache queue;
wherein after sending, by the first control panel, the first information to the target control panel, the method further comprises:
    determining whether the first control panel receives response information to the first information sent by the target control panel;
    in response to determining that the response information is not received and a second thread is not started, periodically attempting to receive the response information, and when a time period of attempting to receive the response information is greater than a second preset time period, and/or a number of attempts to receive the response information is greater than a preset number, generating second prompt information by the first control panel;
    in response to determining that the response information is not received and the second thread is started, generating the second prompt information by the first control panel; and
    in response to determining that the response information is received, playing the response information by the first control panel; and
wherein the one or more target control panels comprise a plurality of second control panels; in response to determining that the first control panel receives response information to the first information sent by the plurality of second control panels, playing the response information by the first control panel comprises:
    in response to determining that respective response information sent by each of the plurality of second control panels is received, integrating the respective response information, and playing the integrated response information by the first control panel.

2. The method according to claim 1, wherein
before starting the first thread corresponding to the first information, the method further comprises:
    determining whether other threads corresponding to other information exist in the cache queue, wherein the other threads are configured to send the other information to the target control panel by the first control panel;
    in response to determining that the other threads exist, determining whether there are threads with existence time periods shorter than the first preset time period in the other threads;
    in response to determining that there is no thread with an existence time period shorter than the first preset time period in the other threads, removing the other threads from the cache queue;
    in response to determining that there are threads with the existence time periods shorter than the first preset time period in the other threads, starting the first thread corresponding to the first information, and when there are some threads with existence time periods longer than or equal to the first preset time period in the other threads, removing the some threads in the other threads from the cache queue; and
executing the first thread comprises:
    according to existence time periods of the other threads with the existence time periods shorter than the first preset time period and the first thread, sequentially executing the other threads with the existence time periods shorter than the first preset time period and the first thread in a descending order of lengths of the existence time periods, and removing the executed other threads and/or first thread from the cache queue.

3. The method according to claim 2, wherein after sending, by the first control panel, the first information to the target control panel, the method further comprises:
determining whether the first control panel receives response information to the first information sent by the target control panel;
in response to determining that the response information is not received and a second thread is not started, periodically attempting to receive the response information, and when a time period of attempting to receive the response information is greater than a second preset time period, and/or a number of attempts to receive the response information is greater than a preset number, generating second prompt information by the first control panel;
in response to determining that the response information is not received and the second thread is started, generating the second prompt information by the first control panel; and
in response to determining that the response information is received, playing the response information by the first control panel.

4. The method according to claim 1, wherein before starting the first thread corresponding to the first information, the method further comprises:
determining whether a length of the cache queue is greater than or equal to a preset length;
in response to determining that the length of the cache queue is greater than or equal to the preset length, determining timeout threads with existence time periods longer than or equal to the first preset time period from the cache queue, and according to times when the timeout threads are added to the cache queue, sequentially removing the timeout threads from the cache queue in an order of the times from early to late.

5. The method according to claim 4, wherein after sending, by the first control panel, the first information to the target control panel, the method further comprises:
determining whether the first control panel receives response information to the first information sent by the target control panel;
in response to determining that the response information is not received and a second thread is not started, periodically attempting to receive the response information, and when a time period of attempting to receive the response information is greater than a second preset time period, and/or a number of attempts to receive the response information is greater than a preset number, generating second prompt information by the first control panel;
in response to determining that the response information is not received and the second thread is started, generating the second prompt information by the first control panel; and
in response to determining that the response information is received, playing the response information by the first control panel.

6. An electronic device, comprising:
one or more processors; and
a memory for storing instructions executable by the one or more processors,
wherein the one or more processors are configured to execute the instructions to implement operations comprising:
receiving first information by a first control panel of a plurality of control panels;
determining one or more target control panels from the plurality of control panels, wherein the plurality of control panels are disposed in different rooms, or at least partially at different locations in a same room;
for each of the one or more target control panels,
detecting whether a room where the target control panel is located is occupied;
in response to determining that the room where the target control panel is located is occupied,
sending, by the first control panel, the first information to the target control panel, and
outputting the first information from the target control panel; and
in response to determining that the room where the target control panel is located is not occupied,
generating first prompt information by the first control panel;
wherein the operations further comprise:
determining whether the target control panel is communicating;
in response to determining that the target control panel is communicating, starting a first thread corresponding to the first information, and adding the first thread to a cache queue, wherein the first thread is configured to send the first information to the target control panel by the first control panel;
wherein sending, by the first control panel, the first information to the target control panel comprises:
in response to determining that the target control panel stops communication within a first preset time period, executing the first thread, and
removing the executed first thread from the cache queue;
wherein the operations further comprise:
determining whether the first control panel receives response information to the first information sent by the target control panel;
in response to determining that the response information is not received and a second thread is not started, periodically attempting to receive the response information, and when a time period of attempting to receive the response information is greater than a second preset time period, and/or a number of attempts to receive the response information is greater than a preset number, generating second prompt information by the first control panel;
in response to determining that the response information is not received and the second thread is started, generating the second prompt information by the first control panel; and
in response to determining that the response information is received, playing the response information by the first control panel; and
wherein the one or more target control panels comprise a plurality of second control panels; in response to determining that the first control panel receives response information to the first information sent by the plurality of second control panels, playing the response information by the first control panel comprises:
in response to determining that respective response information sent by each of the plurality of second control panels is received, integrating the respective response information, and playing the integrated response information by the first control panel.

7. The electronic device according to claim 6, wherein the operations further comprise:
- determining whether other threads corresponding to other information exist in the cache queue, wherein the other threads are configured to send the other information to the target control panel by the first control panel;
- in response to determining that the other threads exist, determining whether there are threads with existence time periods shorter than the first preset time period in the other threads;
- in response to determining that there is no thread with an existence time period shorter than the first preset time period in the other threads, removing the other threads from the cache queue;
- in response to determining that there are threads with the existence time periods shorter than the first preset time period in the other threads, starting the first thread corresponding to the first information, and when there are some threads with existence time periods longer than or equal to the first preset time period in the other threads, removing the some threads in the other threads from the cache queue; and
- executing the first thread comprises:
  - according to existence time periods of the other threads with the existence time periods shorter than the first preset time period and the first thread, sequentially executing the other threads with the existence time periods shorter than the first preset time period and the first thread in a descending order of lengths of the existence time periods, and
  - removing the executed other threads and/or first thread from the cache queue.

8. The electronic device according to claim 6, wherein the operations further comprise:
- determining whether a length of the cache queue is greater than or equal to a preset length;
- in response to determining that the length of the cache queue is greater than or equal to the preset length, determining timeout threads with existence time periods longer than or equal to the first preset time period from the cache queue, and according to times when the timeout threads are added to the cache queue, sequentially removing the timeout threads from the cache queue in an order of the times from early to late.

9. A computer non-transitory readable storage medium, wherein, when instructions in the computer non-transitory readable storage medium are executed by one or more processors of an electronic device, the electronic device is caused to implement operations comprising:
- receiving first information by a first control panel of a plurality of control panels;
- determining one or more target control panels from the plurality of control panels, wherein the plurality of control panels are disposed in different rooms, or at least partially at different locations in a same room;
- for each of the one or more target control panels,
  - detecting whether a room where the target control panel is located is occupied;
  - in response to determining that the room where the target control panel is located is occupied,
    - sending, by the first control panel, the first information to the target control panel, and
    - outputting the first information from the target control panel; and
  - in response to determining that the room where the target control panel is located is not occupied,
    - generating first prompt information by the first control panel;
- wherein the operations further comprise:
  - determining whether the target control panel is communicating;
  - in response to determining that the target control panel is communicating, starting a first thread corresponding to the first information, and adding the first thread to a cache queue, wherein the first thread is configured to send the first information to the target control panel by the first control panel;
- wherein sending, by the first control panel, the first information to the target control panel comprises:
  - in response to determining that the target control panel stops communication within a first preset time period, executing the first thread, and
  - removing the executed first thread from the cache queue;
- wherein the operations further comprise:
  - determining whether the first control panel receives response information to the first information sent by the target control panel;
  - in response to determining that the response information is not received and a second thread is not started, periodically attempting to receive the response information, and when a time period of attempting to receive the response information is greater than a second preset time period, and/or a number of attempts to receive the response information is greater than a preset number, generating second prompt information by the first control panel;
  - in response to determining that the response information is not received and the second thread is started, generating the second prompt information by the first control panel; and
  - in response to determining that the response information is received, playing the response information by the first control panel; and
- wherein the one or more target control panels comprise a plurality of second control panels; in response to determining that the first control panel receives response information to the first information sent by the plurality of second control panels, playing the response information by the first control panel comprises:
  - in response to determining that respective response information sent by each of the plurality of second control panels is received, integrating the respective response information, and playing the integrated response information by the first control panel.

10. The computer non-transitory readable storage medium according to claim 9, wherein the operations further comprise:
- determining whether other threads corresponding to other information exist in the cache queue, wherein the other threads are configured to send the other information to the target control panel by the first control panel;
- in response to determining that the other threads exist, determining whether there are threads with existence time periods shorter than the first preset time period in the other threads;
- in response to determining that there is no thread with an existence time period shorter than the first preset time period in the other threads, removing the other threads from the cache queue;
- in response to determining that there are threads with the existence time periods shorter than the first preset time period in the other threads, starting the first thread corresponding to the first information, and when there are some threads with existence time periods longer than or equal to the first preset time period in the other threads, removing the some threads in the other threads from the cache queue; and executing the first thread comprises:
- according to existence time periods of the other threads with the existence time periods shorter than the first preset time period and the first thread, sequentially executing the other threads with the existence time periods shorter than the first preset time period and the first thread in a descending order of lengths of the existence time periods, and
- removing the executed other threads and/or first thread from the cache queue.

11. The computer non-transitory readable storage medium according to claim 9, wherein the operations further comprise:
- determining whether a length of the cache queue is greater than or equal to a preset length;
- in response to determining that the length of the cache queue is greater than or equal to the preset length, determining timeout threads with existence time periods longer than or equal to the first preset time period from the cache queue, and according to times when the timeout threads are added to the cache queue, sequentially removing the timeout threads from the cache queue in an order of the times from early to late.

* * * * *